United States Patent
Clark

(10) Patent No.: US 10,106,293 B2
(45) Date of Patent: Oct. 23, 2018

(54) PALLET FOR THE STORAGE AND TRANSPORTATION OF ARTICLES

(71) Applicant: Fred E. Clark, Canton, OH (US)

(72) Inventor: Fred E. Clark, Canton, OH (US)

( * ) Notice: Subject to any disclaimer, the term of this patent is extended or adjusted under 35 U.S.C. 154(b) by 0 days.

(21) Appl. No.: 14/924,152

(22) Filed: Oct. 27, 2015

(65) Prior Publication Data

US 2016/0122078 A1    May 5, 2016

Related U.S. Application Data

(60) Provisional application No. 62/074,456, filed on Nov. 3, 2014.

(51) Int. Cl.
| | |
|---|---|
| *B65G 1/00* | (2006.01) |
| *B65D 19/42* | (2006.01) |
| *B65D 19/44* | (2006.01) |
| *B65G 1/06* | (2006.01) |
| *B65G 1/08* | (2006.01) |
| *B65D 85/06* | (2006.01) |

(52) U.S. Cl.
CPC ............. *B65D 19/42* (2013.01); *B65D 19/44* (2013.01); *B65D 85/06* (2013.01); *B65G 1/06* (2013.01); *B65G 1/08* (2013.01); *B65D 2519/00781* (2013.01); *B65D 2519/00815* (2013.01); *B65G 2201/0273* (2013.01)

(58) Field of Classification Search
CPC ................................ B65G 1/0421; B65G 1/08
USPC .......................................... 414/273, 276, 286
See application file for complete search history.

(56) References Cited

U.S. PATENT DOCUMENTS

| | | | |
|---|---|---|---|
| 2,950,014 A | 8/1960 | Sullivan | |
| 3,399,784 A | 9/1968 | Buchbinder et al. | |
| 4,155,462 A | 5/1979 | Bendel | 211/151 |
| 4,197,047 A | 4/1980 | Haldimann | 414/276 |
| 4,341,313 A | 7/1982 | Doring | 211/151 |
| 4,462,500 A | 7/1984 | Konstant et al. | 211/151 |

(Continued)

FOREIGN PATENT DOCUMENTS

| | | |
|---|---|---|
| EP | 1223003 A1 | 7/2002 |
| EP | 1970319 A1 | 9/2008 |

(Continued)

OTHER PUBLICATIONS

European Search Report for Application No. EP15192660.7.

*Primary Examiner* — Saul Rodriguez
*Assistant Examiner* — Willie Berry, Jr.
(74) *Attorney, Agent, or Firm* — Alvin T. Rockhill

(57) ABSTRACT

The present invention provides pallets for use in gravity pallet flow racks and pallet push back racks which resist becoming misaligned and jammed in such racks. This accordingly provides better reliability (reduces down time) and reduces the manual labor which is required to clear jammed pallets from such rack systems. The use of these pallets in gravity pallet flow racks and pallet push back racks does not compromise any of the inherent advantages of such systems. In other words, systems which utilize the pallets of this invention offer highly efficient use of warehouse space and require low maintenance. They are also compatible for use in conjunction with machinery designed for automatically placing, positioning, and/or stacking the pallets in an organized manner in the system and retrieving the pallets which are stored in the system.

14 Claims, 6 Drawing Sheets

(56) References Cited

U.S. PATENT DOCUMENTS

| | | | |
|---|---|---|---|
| 4,582,188 A | 4/1986 | Seiz et al. | 193/40 |
| 4,613,270 A | 9/1986 | Konstant et al. | 414/276 |
| 4,687,404 A | 8/1987 | Seiz et al. | 414/276 |
| 4,715,765 A | 12/1987 | Agnoff | 414/276 |
| 4,773,546 A | 9/1988 | Konstant | 211/151 |
| 4,915,240 A | 4/1990 | Konstant | 211/151 |
| 4,936,738 A | 6/1990 | Brennan et al. | 414/786 |
| 4,949,852 A | 8/1990 | Allen | 211/151 |
| 4,982,851 A | 1/1991 | Konstant | 211/151 |
| 4,988,251 A | 1/1991 | Kinney | 414/276 |
| 5,080,241 A | 1/1992 | Konstant | 211/151 |
| 5,141,118 A | 8/1992 | Gay | 211/151 |
| 5,170,896 A | 12/1992 | Konstant | 211/151 |
| 5,178,288 A | 1/1993 | Werner et al. | 211/151 |
| 5,184,738 A | 2/1993 | Allen | 211/151 |
| 5,285,909 A | 2/1994 | Slater | 211/151 |
| 5,328,038 A | 7/1994 | Allen | 211/151 |
| 5,393,188 A | 2/1995 | Scott et al. | 414/276 |
| 5,482,422 A | 1/1996 | Hammond | 414/276 |
| 5,642,976 A | 7/1997 | Konstant | 414/276 |
| 6,112,915 A | 9/2000 | Lewis | 211/151 |
| 6,158,943 A | 12/2000 | Sullivan | 414/286 |
| 6,431,378 B1 | 8/2002 | Lewis | 211/151 |
| 6,851,562 B2 | 2/2005 | Gorniak et al. | 211/59.2 |
| 8,739,985 B2 | 6/2014 | Krummell et al. | 211/151 |
| 2004/0265097 A1* | 12/2004 | Kim | B29D 30/0061 414/286 |
| 2010/0316468 A1* | 12/2010 | Lert | B65G 1/045 414/273 |

FOREIGN PATENT DOCUMENTS

| | | |
|---|---|---|
| JP | S61 60506 A | 3/1986 |
| JP | 2013 086901 A | 5/2013 |
| JP | 2014 156306 A | 8/2014 |

\* cited by examiner

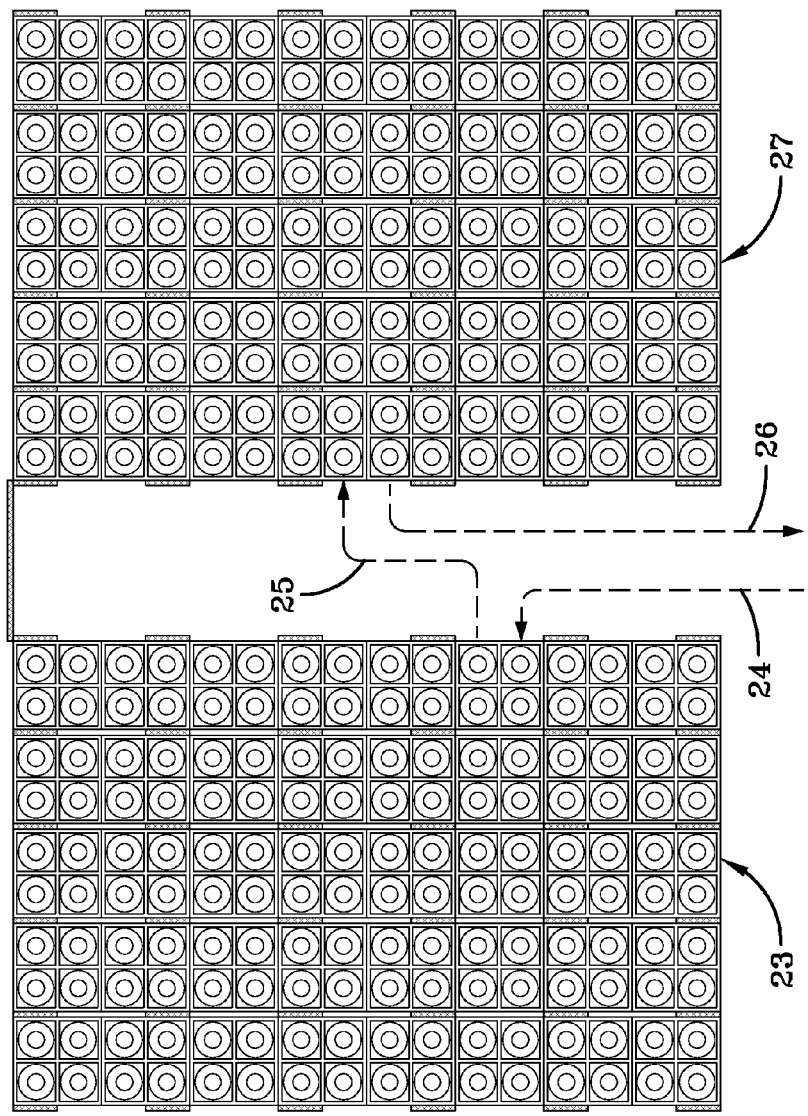

ern pallet as a function of in-process inventory flow within the tire plant.

PALLET FOR THE STORAGE AND TRANSPORTATION OF ARTICLES

This application claims the benefit of U.S. Provisional Patent Application Ser. No. 62/074,456, filed on Nov. 3, 2014. The teachings of U.S. Provisional Patent Application Ser. No. 62/074,456 are incorporated herein by reference in their entirety.

BACKGROUND OF THE INVENTION

Pallets are widely used in transporting and storing a wide variety of materials, documents, foods, component parts, in-process inventory, and articles of manufacture. Such products are typically loaded onto a pallet for ease of transportation and storage because the pallet can be easily moved with a forklift truck to move the items thereon to a desired location. For instance, goods of all types are commonly loaded onto a pallet for transportation by truck, rail, or ship and then stored on the pallet for subsequent use in a warehouse. Component parts and in-process inventory is also frequently transported within a factory or between factories for subsequent use in making completed products. For instance, in tire manufacturing operations, green tires (uncured tires) are initially built on tire building machines and subsequently delivered to cure presses for vulcanization into cured tires. In some cases, the green tires are stored on the pallets or buggies for some period of time before being cured as a function of in-process inventory flow within the tire plant.

Conventional pallets typically include a top plate, a bottom plate, and stringers which connect the top plate to the bottom plate and provide a desired spacing which is typically between 3.5 inches and 10 inches between the top plate and the bottom plate. For instance, the spacing between the top plate and the bottom plate will typically be between 3.5 inches in the case of wooden pallets. Pallets can be designed for two-way entry or four-way entry to facilitate transportation with forklift trucks. Pallets which are designed for general purpose applications typically have an essentially flat top plate which can consist of a single flat surface, such as a flat piece of plywood, or it can consist of a series of boards which are affixed to the stringers. Such pallets can be made of wood, plastic or metal. However, in some cases the pallet will be designed for transporting and/or storing a specific item. For instance, in the case of green tires the pallet may include a top plate having one or more tapered or venturi shaped cavities (holders) which are specifically adapted for receiving the green tires. The holders will be made with a material which has a surface which allows for ease of release of the green tire there from. In other words, the green tire should not have a propensity to adhere or stick to the holder. Such tire pallets typically include at least one such holder and can include many holders for receiving the green tires.

In state of the art facilities, automatic stacking and retrieval systems (ASRS) are frequently utilized to efficiently store pallets which are loaded with desired items. In such systems, the pallets are loaded onto simple pallet racks, drive-in/drive-thru racks, telescoping frame racks, gravity pallet flow racks, or pallet push back racks. In the case of simple pallet racks the pallets are loaded onto the rack in a configuration which is only one pallet deep. Simple pallet rack systems offer the advantage of being low cost and require low maintenance, but do not provide efficient utilization of warehouse space. This is because pathways need to be provided to allow access to at least one side of each rack space on which pallets are stored. Telescoping frame racks, gravity pallet flow racks, and pallet push back racks provide for much more efficient utilization of floor space. However, telescoping frame racks take more vertical space, are generally limited to being up to four pallets deep, are more costly, and require more maintenance due to their array of moving parts. Gravity pallet flow racks require access to both sides of each row in which pallets are stored (one side for insertion of the pallet, and the other side for pallet removal). Accordingly, pallet push back racks make more efficient use of warehouse space because these racks can store more pallets with fewer gantries due to multiple pallets being capable of being stored in each pigeonhole.

In gravity pallet flow racks and pallet push back racks, the pallets typically slide through the racks on skate wheels which are mounted on beams within the racks. In the case of gravity pallet flow racks, the pallets slide through the rack from an entry side to an exit side via the force of gravity. This is accomplished by designing the racks to be at a decline with the entry side of the rack being higher than the exit side. Pallet push back racks have only one point for insertion and removal of pallets per row of pallets in the rack. The front of each pigeonhole (row of pallets) is at a lower level than the back of the pigeonhole. Accordingly, pallets can be pushed into the pigeonholes against the force of gravity, but slide over the skate wheels on the floor of the pigeonholes back to the front of the rack as pallets are removed from the pigeonhole. Pallets are generally removed from the pigeonholes by lifting them over a stop at the front of the rack.

It is not uncommon for pallets to get misaligned and to become jammed in gravity pallet flow racks and pallet push back racks. This is undesirable because it causes down time and requires labor to clear the jammed pallet or pallets. There is accordingly a need for a low cost, low maintenance reliable system for storing pallets which efficiently utilizes warehouse space. It would also be desirable for such a system to include a means for automatic stacking and retrieval of pallets stored in the system.

SUMMARY OF THE INVENTION

The present invention provides pallets for use in gravity pallet flow racks and pallet push back racks, which are not prone to misalignment or becoming jammed in such racks. This invention accordingly provides better reliability (reduces down time) and reduces the manual labor which is required to clear jammed pallets from such rack systems. The use of these pallets in gravity pallet flow racks and pallet push back racks does not compromise any of the inherent advantages of such systems. In other words, systems which utilize the pallets of this invention offer highly efficient use of warehouse space and require low maintenance. Since the racks utilized in the practice of this invention use no moving parts, they inherently require low maintenance. More specifically, no moving parts are necessary because these racks hold the pallets at an incline so that the pallets can move as a result of gravity. In the event that it is necessary to repair or maintain the pallets of this invention, they can be totally removed from the system for such repairs or maintenance which facilitates ease of work and which does not interfere with the ongoing operation of the system. They are also compatible for use in conjunction with a means for automatically placing, positioning, and/or stacking the pallets in an organized manner in the system and retrieving the pallets which are stored in the system. Accordingly, an automatic integrated control system may be used to deliver and retrieve pallets in this system.

The present invention more specifically discloses a pallet which is particularly useful for storage in gravity pallet flow racks and pallet push back racks, said pallet being comprised of a top plate, wherein said top plate is essentially rectangular in shape and has four corners, a bottom plate, stringers which separate the top plate to the bottom of the pallet, at least four vertically mounted wheels which are affixed to the pallet in positions which are in close proximity to the four corners of the top plate and at least four horizontally mounted guide wheels which are mounted in close proximity to the four corners of the top plate.

The wheels of the pallets used in either the pallet push back rack system or the pallet flow rack system are adapted for rolling on the support rails of the pigeonholes and rack systems. This rack contacting surface can be comprised of metal, rubber, nylon, polyurethane, or any other suitable polymeric material or combinations thereof. The vertically mounted wheels are typically located on the inside of the perimeter of the pallet, and more typically located on the inside perimeter of the top plate of the pallet. The horizontally mounted wheels are typically located on the inside of the perimeter of the front of the pallet, and inside or slightly outside of the side perimeter of the pallet. The pallets of the subject invention may further include a bottom plate, wherein stringers would connect the top plate to the bottom plate, and separate the top plate from the bottom plate.

The subject invention further reveals a pallet push back rack system which includes (1) a plurality of pallets which are comprised of a top plate, wherein said top plate is essentially rectangular in shape and has four corners, stringers which separate the top plate to the bottom of the pallet, at least four vertically mounted wheels which are affixed to the pallet in positions which are in close proximity to the four corners of the top plate and at least four horizontally mounted guide wheels which are mounted in close proximity to the four corners of the top plate, and (2) at least one pallet push back rack having a plurality of pigeonholes and wherein the pigeonholes have a pallet insertion/removal end and a back end, wherein the pallet insertion/removal end of the pigeonholes is at a lower level than the back end of the pigeonholes, wherein the pigeonholes include pallet support rails which are adapted for supporting the vertically mounted wheels of the pallets, and pallet alignment rails which are adapted for coming into contact with the horizontally mounted wheels of the pallets. The pigeonhole slots used in this rack system are designed to hold multiple pallets. Generally one pallet will be pushed backwards into the pigeonhole slot from a gantry within the rack system, in order to make space to add one or more additional pallets onto the rack.

The present invention also reveals a pallet flow rack system which includes (1) a plurality of pallets which are comprised of a top plate, wherein said top plate is essentially rectangular in shape and has four corners, optionally a bottom plate, and optionally stringers which separate and elevate the top plate from the bottom of the pallet, at least four vertically mounted wheels which are affixed to the pallet in positions which are in close proximity to the four corners of the top plate and at least four horizontally mounted guide wheels which are mounted in close proximity to the four corners of the top plate, and (2) at least one pallet flow rack having a plurality of pigeonholes, wherein the pigeonholes have a pallet insertion end and a pallet removal end, wherein the pallet insertion end of the pigeonholes is at a lower level than the pallet removal end of the pigeonholes, wherein the pigeonholes include pallet support rails which are adapted for supporting the vertically mounted wheels of the pallets, and pallet alignment rails which are adapted for coming into contact with the horizontally mounted wheels of the pallets.

The pigeonholes utilized in the pallet flow rack systems of the present invention have a pallet insertion end and a pallet removal end. The pallet insertion end is at a level which is higher than the pallet removal end. Accordingly, the pigeonholes are on an incline with the pallet insertion end being at a higher position than the pallet removal end. That incline can be within the range of about 1° to about 8°. Preferably the pigeonholes will be at an incline within the range of about 1° to about 4°, and most preferably within the range of about 1.5° to about 3°.

Pallets which are empty or loaded may be stored in the pigeonholes of either pallet system. A "loaded pallet" can refer to a pallet which is entirely or partially loaded. More specifically, a loaded pallet can refer to a pallet containing any amount of material, inventory, products, or goods by any other terminology, while an empty pallet is a pallet which is void of such items. The pigeonholes can be spaced within the rack at varying heights to accommodate numerous pallet sizes, including inventory thereon, which will vary based upon whether the pallets are loaded, partially loaded, or empty.

BRIEF DESCRIPTION OF THE DRAWINGS

FIG. 6 depicts an aerial view of the pallet push back system that may be utilized in conjunction with this invention.

DETAILED DESCRIPTION OF THE INVENTION

Figure 1:
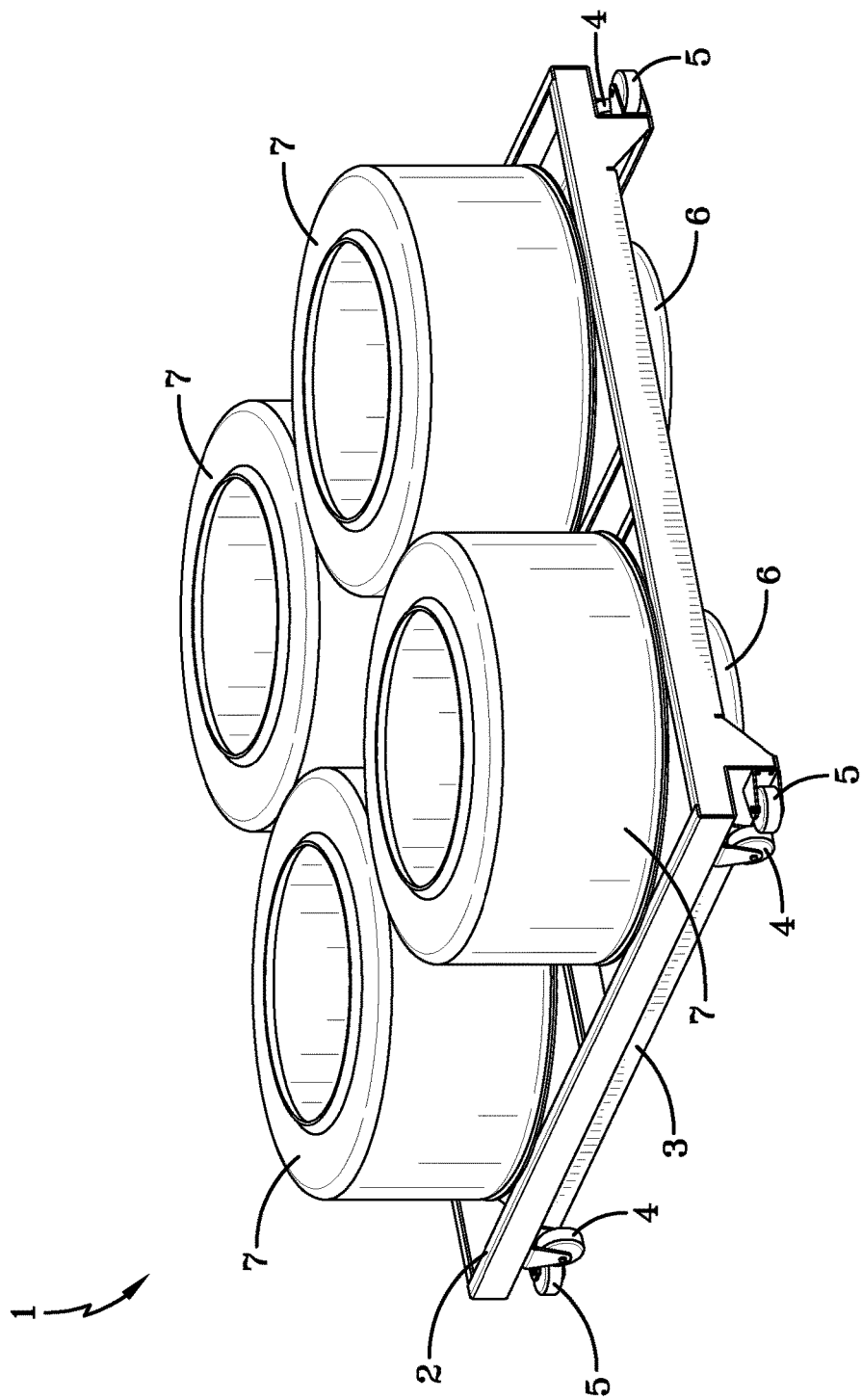
FIG. 1 is a perspective view of a pallet of this invention with four green tires being held thereon.
Figure 2:
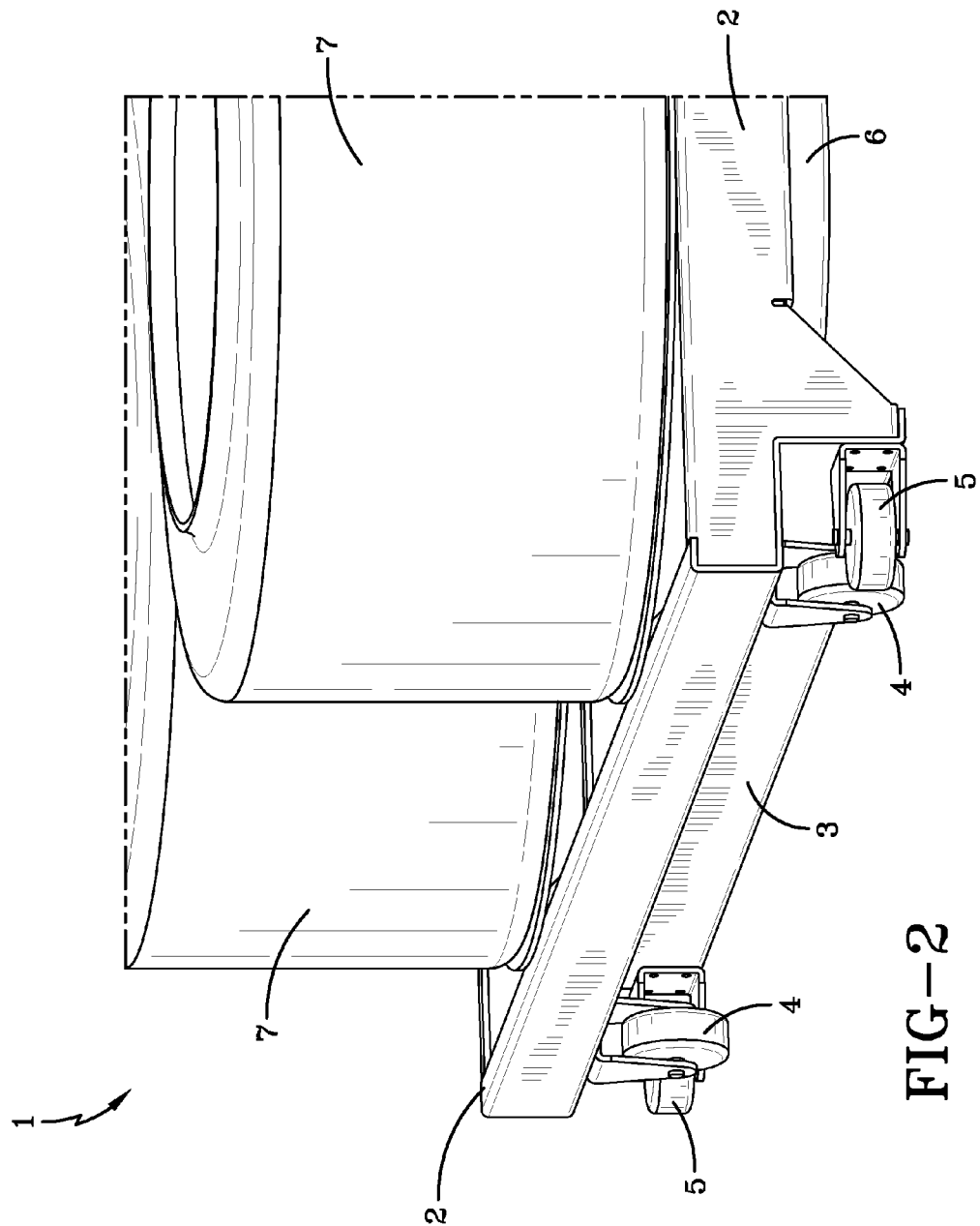
FIG. 2 is a perspective view of a pallet of this invention showing the vertically mounted wheels and the horizontally mounted wheels on one side of the pallet.

The pallets 1 of this invention have a top plate 2, stringers 3, at least four vertically mounted support wheels 4, and at least four horizontally mounted guide wheels 5 as illustrated in FIGS. 1 and 2. The wheels 4 of this invention are preferably high quality wheels, such as caster wheels, to ensure that the pallets will travel smoothly through the racks without sticking or jamming. The pallets 1 of this invention can optionally have a top plate 2 which includes at least one tapered or venturi shaped depression 6 which is adapted for transporting and storing green tires 7. The pallets 1 can also be designed to include other features which are adapted for transporting and storing a wide variety of manufactured products or component parts. In another embodiment of this invention, the pallet can be of a general purpose design which can transport or store a wide variety of different variegated manufactured products, component parts, or raw materials on the same pallet. The pallets 1 utilized in the practice of this invention can optionally be equipped with bumpers or cushioning devices to absorb impact energy so as to protect the pallets 1 and the system from damage which occurs as the pallets 1 move through the system and collide with each other.

Figure 3:
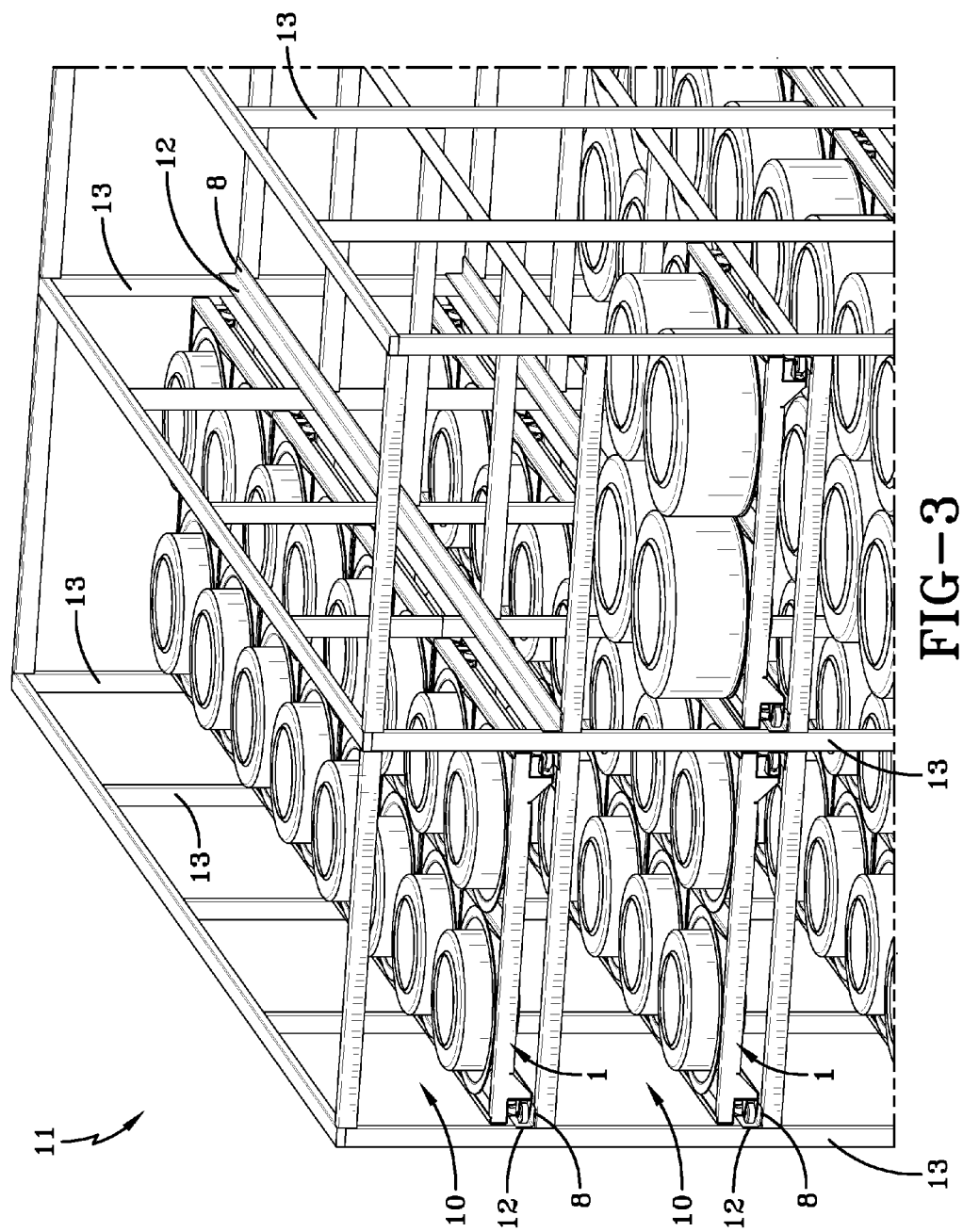
FIG. 3 depicts a pallet push back system of this invention having pigeonholes which are filled with pallets that are loaded with green tires.

The pallet 1 depicted in FIG. 1 includes four tapered or venturi shaped depressions 6 which are adapted for holding and transporting green tires 7. It is unique and beneficial to transport tires in groups of four to improve efficiency within the system. However, such pallets can be designed to transport any desired number of tires. For instance, a pallet which is utilized in transporting large truck tires may conveniently be adapted for holding only a single tire. Pallets 1 a can also be adapted for holding two tires, four tires, or some other multiple of two or three. For instance, the pallet 1 can be designed to hold virtually any desired number of small sized tires such as golf cart tires, ATV tires, motorcycle tires and the like. The inclusion of multiple tapered or venture shaped depressions can be cost effective by virtue of making more efficient use of the pallets and the system in general. In any case, the pallets 1 will include at least four vertically mounted support wheels 4 which are adapted for traveling on pallet support rails 8 within the pigeonholes 10 of the rack system 11. The pallets 1 will also include horizontally mounted guide wheels 5 which are adapted for alignment with pallet alignment rails 12 which are situated within the pigeonholes 10 of the rack system 11. It is convenient to utilize a single angle iron structural shape which serves as both the support rail 8 and as the alignment rail 12, as shown in FIG. 3. These angle iron shaped pieces are typically affixed at the two bottom corners of each pigeonhole 10. The pallet rack system will typically have pigeonholes which run at an angle of inclination from front to back which is within the range of about 1° to about 8°. For instance, the angle of inclination can be within the range of about 1° to about 4° and will frequently be within the range of about 1.5° to about 3°. In this case of pallet push back rack systems this angle is measured from the front to the back of the rack with the back of the rack being higher than the front of the rack. In the case of pallet flow rack systems this angle of inclination is measured from the pallet removal end of the rack to the pallet insertion end of the rack with the pallet insertion end of the rack being higher than the pallet removal end of the rack.

The racks 13 utilized in conjunction with the pallets 1 of this invention will include an array of pigeonholes 10 which are deep enough to hold a plurality of such pallets. These pigeonholes 10 will normally be in an array where they are at least several rows deep (stacked on top of each other) and many rows wide. In some cases, it is desirable to include pigeonholes of differing heights to maximize storage capacity. For instance, empty pallets can be stored in pigeonholes which are of a minimum height. On the other hand, passenger and light truck tires will require a pigeonhole of greater height with the pigeonhole required to hold the largest tires having an even greater height. Thus, the rack systems utilized in accordance with this invention can optionally have pigeonholes which are of more than one height.

Figure 4:
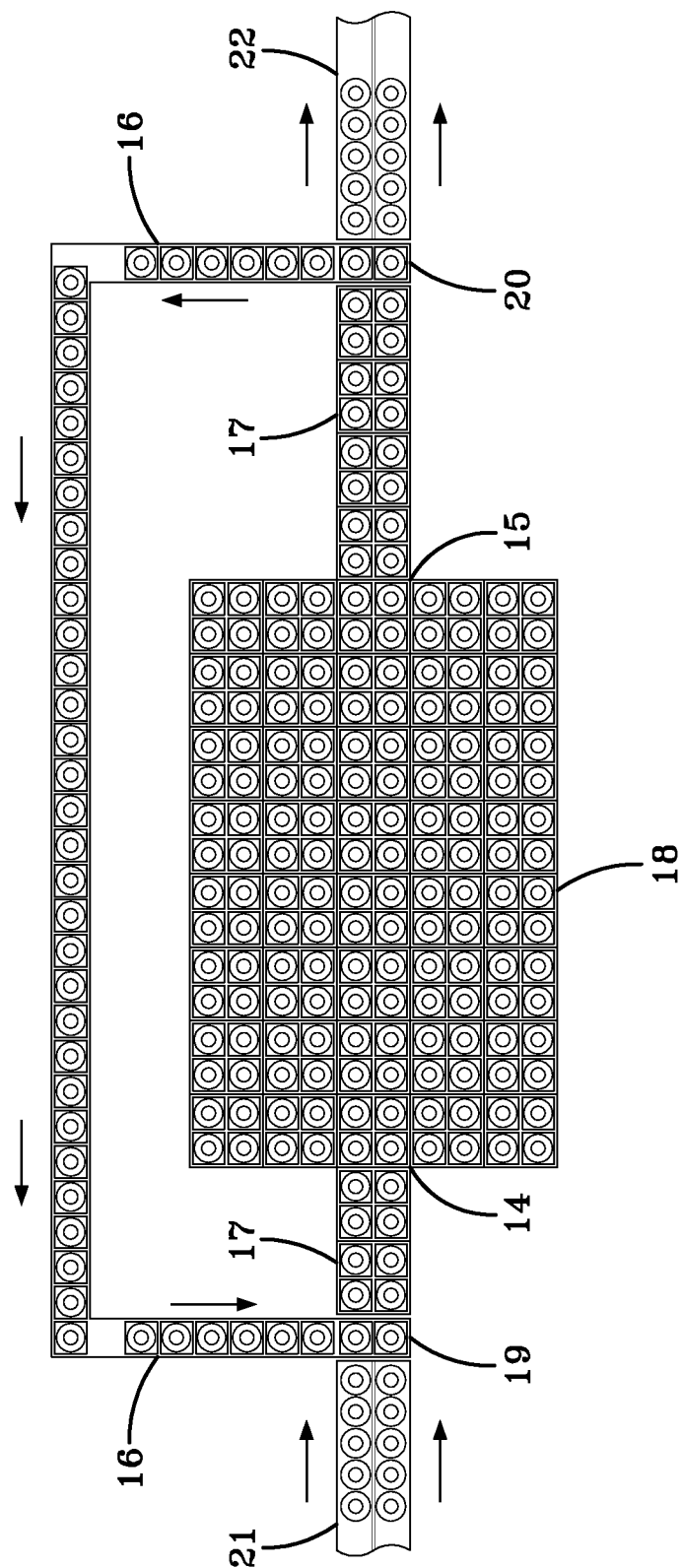
FIG. 4 shows an example of the pallet flow rack system that may be utilized in conjunction with this invention.

FIG. 4 depicts one embodiment of the subject invention wherein the pallets are used in a pallet flow rack system. The pallet flow rack system includes at least one pallet flow rack 18 having a plurality of pigeonholes and a plurality of pallets. Incoming goods 21 are loaded onto pallets at a pallet loading point 19. These loaded pallets are then moved into pigeonholes within the flow rack system. The pigeonholes have a pallet insertion end 14 and a pallet removal end 15, this allows loaded pallets 17 in the system to move in the direction that corresponds to the arrangement of the pigeonholes. Outgoing goods 22 are unloaded from the pallets at a pallet unloading point 20. Empty pallets 16 generally move in a direction that is opposite to the direction that the loaded pallets 17 move. In any case, the empty pallets move from the pallet unloading point 20 to the pallet loading point 19. This system efficiently makes empty pallets 16 available to become loaded at the moment that they are needed to transport goods. The pallet insertion end 14 of the pigeonholes is at a lower level than the pallet removal end 15 of the pigeonholes. This arrangement allows the force of gravity to facilitate pallet movement through the rack system.

Figure 5:
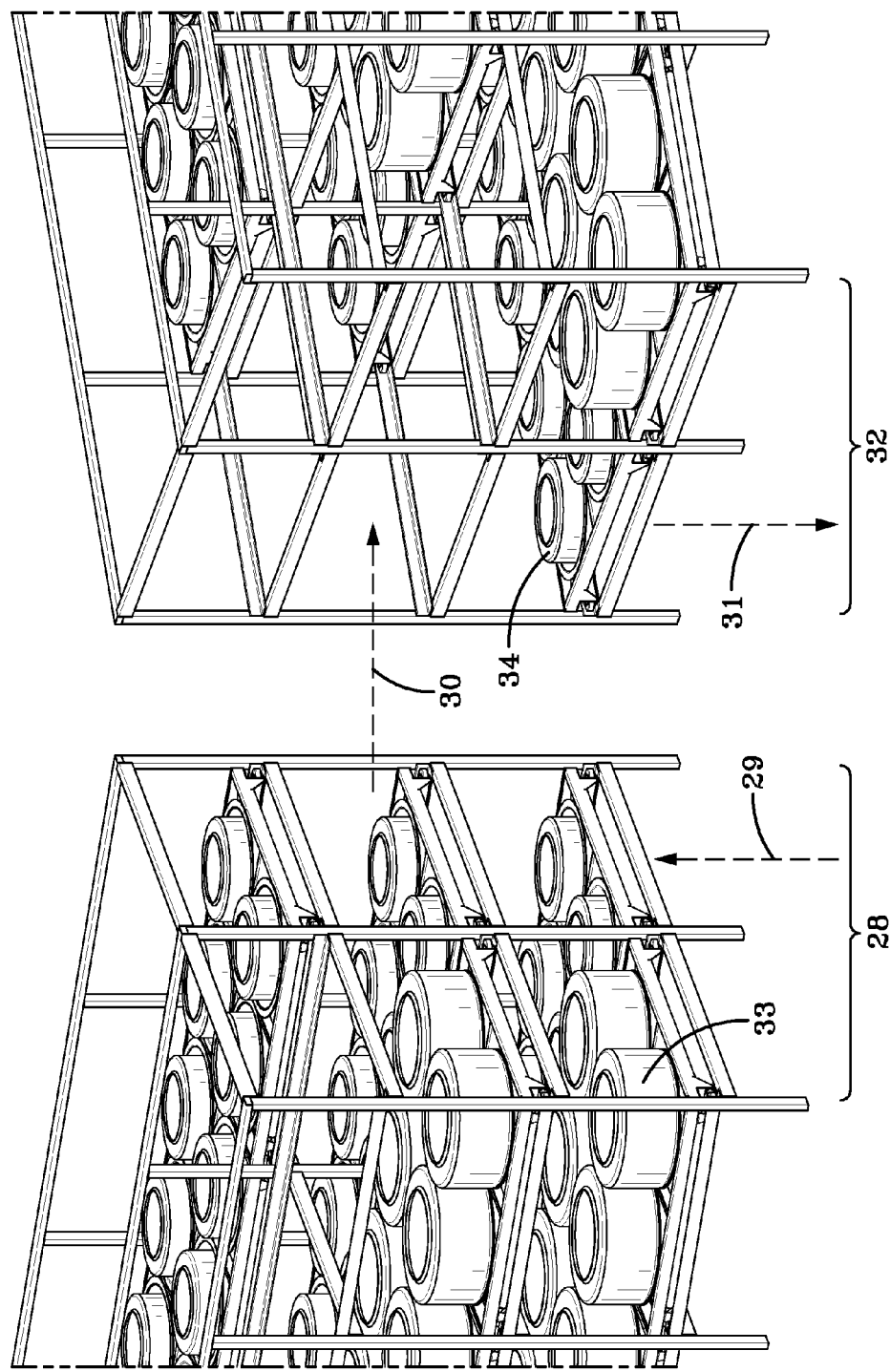
FIG. 5 provides an example of the pallet push back system that may be utilized in conjunction with this invention.

FIGS. 5 and 6 depict another embodiment of the subject invention wherein the pallets are used in a pallet push back system. The pallet push back rack system shown includes two pallet racks, shown as a first pallet rack 23 (as illustrated in FIG. 6), 28 (as illustrated in FIG. 5) and a second pallet rack 27, 32. In this system, loaded pallets 33 and empty pallets 34 may be added and/or removed from either the first pallet rack 23, 28 or the second pallet rack 27, 32 in three simple steps. In alternative embodiments of this invention, the pallet push back rack system can include a single pallet rack or multiples thereof, positioned adjacently or in tandem to one another.

In one phase of operation loaded pallets can be added to the pallet push back system for storage of inventory. In this mode of operation, in step one 24, 29 a loaded pallet is added to a first pigeon hole in a first pallet rack 23, 28. In step two 25, 30 a pallet transport cart within the gantry is free to move to a second pigeonhole which contains an empty pallet, and remove the empty pallet from that second pigeonhole. This movement can be from a pigeonhole within the first pallet rack 23, 28 to a pigeonhole within a second pallet rack 27, 32, or the movement can be from a pigeonhole within the first pallet rack 23, 28 to a second pigeonhole within the first pallet rack 23, 28. In step three 26, 31 a pallet transport cart moves the empty pallet through the gantry, and exits from the pallet rack system.

In another scenario loaded pallets are being removed from the system. In step one 24, 29 a pallet transport cart moves an empty pallet to a pigeonhole having the capacity to hold at least one additional pallet, and the empty pallet is inserted into that pigeonhole. In step two 25, 30 the pallet transport cart within the gantry moves to a pigeonhole which contains a loaded pallet, and it removes the loaded pallet from that pigeonhole. In step three 26, 31 a pallet transport cart moves the loaded pallet through the gantry, and exits the pallet rack system. After exiting the system, the loaded pallet is unloaded and the resulting empty pallet may be returned to the rack system.

More specifically, the pallet push back rack system as depicted in FIG. 5 and FIG. 6 includes a first rack 23, 28 and a second rack 27, 32 with the first rack 23, 28 being opposite to the second rack 27, 32, wherein a gantry is between the first rack 23, 28 and the second rack 27, 32, and wherein said pallets are stored on and retrieved from the first rack 23, 28 and the second rack 27, 32 from a single point of entry. This pallet push back rack system can include loaded pallets and empty pallets wherein essentially all empty pallets are stored in pigeonholes as a function of the system. One of the benefits of this system is that it simplifies and improves system flow and the handling of both empty and loaded pallets by minimizing unnecessary movement within the system. The storage of manufactured goods, in process inventory, and raw materials is more efficiently balanced using this system. This system effectively minimizes pallet build-up outside of the system and simultaneously provides quick access to loaded or empty pallets when they are needed.

The pallet push back rack system is particularly useful in conjunction with the claimed invention to tire manufacturers, because it enables manufacturers to balance the flow of tires in the building phases and curing phases of the tire manufacturing process. This is because there is frequently an imbalance between the number of tires being built and the curing capacity, which is dependent upon numerous variables including: types of tires, tire sizes, curing temperatures, and curing times required. Any manufacturer producing goods wherein there is imbalance in in-process inventory anywhere within the manufacturing process can benefit from using such a pallet push back rack system, including the three point movement previously described. This system eliminates waiting time associated with mechanically handling goods and with multiple gantry systems, because it allows for a single gantry to more efficiently facilitate the flow of pallets between racks. A single gantry in this system can deposit a first pallet into a first pigeonhole, remove a second pallet from a second pigeonhole, and exit the rack area from the same space in which it entered the rack area. By using a single gantry, operators can more easily control and monitor loaded and empty pallets stored within the racks, and operators further benefit from a more efficient flow of pallets through the system.

While certain representative embodiments and details have been shown for the purpose of illustrating the subject invention, it will be apparent to those skilled in this art that various changes and modifications can be made therein without departing from the scope of the subject invention.

What is claimed is:

1. A pallet push back rack system which includes at least one pallet push back rack having a plurality of pigeonholes, wherein said pigeonholes are designed to hold a plurality of pallets which are comprised of a top plate, wherein said top plate is essentially rectangular in shape and has four corners, at least four vertically mounted wheels which are affixed to the pallet in positions which are in close proximity to the four corners of the top plate, and at least four horizontally mounted guide wheels which are mounted in close proximity to the four corners of the top plate, wherein the pallet is adapted for storage in the gravity pallet push back rack system, wherein the pigeonholes have a pallet insertion/removal end and a back end, wherein the pallet insertion/removal end of the pigeonholes is at a lower level than the back end of the pigeonholes, wherein the pigeonholes include pallet support rails which are adapted for supporting the vertically mounted wheels of the pallets, wherein the pigeonholes are at an angle of incline from front to back which is within the range of about 1 degree to about 8 degrees, wherein the vertically mounted wheels of the pallets are adapted for rolling on the support rails of the pallet push back rack system, and wherein the pallet push back rack system further includes pallet alignment rails which are adapted for coming into contact with the horizontally mounted wheels of the pallets, wherein said pallets are not motorized.

2. The pallet push back rack system as specified in claim 1 wherein the pigeonholes are at an angle in incline from front to back which is within the range of about 1° to about 4°.

3. The pallet push back rack system as specified in claim 1 wherein the pigeonholes are at an angle in incline from front to back which is within the range of about 1.5° to about 3°.

4. The pallet push back rack system as specified in claim 1 wherein the pallet push back rack system is part of an automatic stacking and retrieval system.

5. The pallet push back rack system as specified in claim 4 wherein the automatic stacking and retrieval system utilizes integrated controls to deliver to the system and retrieve pallets from the system.

6. The pallet push back rack system as specified in claim 4 wherein the system includes a first rack and a second rack with the first rack being opposite to the second rack and wherein a gantry is between the first rack and the second rack, and wherein said pallets are stored on and retrieved from the first rack and the second rack from a single point of entry located on only one end of the racks.

7. The pallet push back rack system as specified in claim 6 wherein said system includes loaded pallets and empty pallets and wherein essentially all empty pallets are stored in pigeonholes as a function of the system.

8. The pallet push back rack system as specified in claim 1 wherein empty pallets are stored in the pigeonholes of the push back rack system.

9. A pallet flow rack system which includes at least one pallet flow rack having a plurality of pigeonholes and a plurality of pallets which are comprised of a top plate, wherein said top plate is essentially rectangular in shape and has four corners, at least four vertically mounted wheels which are affixed to the pallet in positions which are in close proximity to the four corners of the top plate, and at least four horizontally mounted guide wheels which are mounted in close proximity to the four corners of the top plate, wherein the pallet is adapted for storage in the pallet flow rack system, wherein the pigeonholes have a pallet insertion end and a pallet removal end, wherein the pallet insertion end of the pigeonholes is at a lower level than the pallet removal end of the pigeonholes, wherein the pigeonholes include pallet support rails which are adapted for supporting the vertically mounted wheels of the pallets, wherein the pigeonholes are at an angle in incline from the pallet insertion end to the pallet removal end which is within the range of about 1° to about 8°, wherein the vertically mounted wheels of the pallets are adapted for rolling on the support rails of the pallet flow rack system, and wherein the pallet flow rack system further includes pallet alignment rails which are adapted for coming into contact with the horizontally mounted wheels of the pallets, wherein said pallets are not motorized.

10. The pallet flow rack system as specified in claim 9 wherein the pigeonholes are at an angle in incline from the pallet insertion end to the pallet removal end which is within the range of about 1° to about 4°.

11. The pallet flow rack system as specified in claim 9 wherein the pigeonholes are at an angle in incline from the pallet insertion end to the pallet removal end which is within the range of about 1.5° to about 3°.

12. The pallet flow rack system as specified in claim 9 wherein the pallet flow rack system is part of an automatic stacking and retrieval system.

13. The pallet flow rack system as specified in claim 12 wherein the automatic stacking and retrieval system utilizes integrated controls to deliver to the system and retrieve pallets from the system.

14. The pallet push back rack system as specified in claim 9 wherein empty pallets are stored in the pigeonholes of the pallet flow rack system.

* * * * *